(12) United States Patent
Zhou et al.

(10) Patent No.: US 11,498,766 B2
(45) Date of Patent: Nov. 15, 2022

(54) WAREHOUSING SYSTEM, MATERIAL TRANSPORTING METHOD, CONTROL TERMINAL, ROBOT, AND STORAGE MEDIUM

(71) Applicant: HAI ROBOTICS CO., LTD., Shenzhen (CN)

(72) Inventors: Hongxia Zhou, Shenzhen (CN); Xiaolong Li, Shenzhen (CN); Xin Ai, Shenzhen (CN)

(73) Assignee: HAI ROBOTICS CO., LTD.

( * ) Notice: Subject to any disclaimer, the term of this patent is extended or adjusted under 35 U.S.C. 154(b) by 0 days.

(21) Appl. No.: 17/497,331

(22) Filed: Oct. 8, 2021

(65) Prior Publication Data
US 2022/0112031 A1 Apr. 14, 2022

(30) Foreign Application Priority Data
Oct. 10, 2020 (CN) .......................... 202011078312.6

(51) Int. Cl.
*B65G 1/137* (2006.01)
*B25J 9/16* (2006.01)
(Continued)

(52) U.S. Cl.
CPC .......... *B65G 1/1376* (2013.01); *B25J 9/1679* (2013.01); *B65G 1/0492* (2013.01);
(Continued)

(58) Field of Classification Search
CPC .. B65G 47/682; B65G 1/1376; B65G 1/0492; B65G 1/1373; B65G 67/02; B25J 9/1679;
(Continued)

(56) References Cited

U.S. PATENT DOCUMENTS 3,889,797 A * 6/1975 Naito ..................... B23Q 41/06
198/465.1
5,372,233 A * 12/1994 Fujino ..................... B65G 43/08
198/346.2
(Continued)

FOREIGN PATENT DOCUMENTS

CN 1939815 A 4/2007
CN 105989660 A 10/2016
(Continued)

OTHER PUBLICATIONS

International Search Report in PCT International Application No. PCT/CN2021/122548 dated Dec. 17, 2021.
(Continued)

*Primary Examiner* — Thomas Randazzo
(74) *Attorney, Agent, or Firm* — Dilworth IP, LLC

(57) ABSTRACT

The present disclosure provides a warehousing system, a material transporting method, a control terminal, a robot and a storage medium. Where the robot performs material fetching according to a control instruction of a control terminal, transports a material to a destination, and automatically docks with a conveyor line at the destination so as to automatically transport the material to the conveyor line. Manual participation is not needed in the material transporting process, therefore material transporting efficiency can be improved; besides, by configuring different conveyor lines corresponding to different workstations, the material conveying of each workstation does not affect each other, and the workstation with low material processing efficiency does not cause effect on other workstations, thereby facilitating to improve overall work efficiency of all workstations.

19 Claims, 6 Drawing Sheets

(51) Int. Cl.
*B65G 1/04* (2006.01)
*B65G 47/68* (2006.01)
*B65G 67/02* (2006.01)
*G05B 19/418* (2006.01)
*G05D 1/02* (2020.01)

(52) U.S. Cl.
CPC ......... *B65G 1/1373* (2013.01); *B65G 47/682* (2013.01); *B65G 67/02* (2013.01); *G05B 19/41895* (2013.01); *G05D 1/02* (2013.01); *G05D 1/0225* (2013.01); *G05D 2201/0216* (2013.01)

(58) Field of Classification Search
CPC .. G05B 19/41895; G05D 1/02; G05D 1/0225; G05D 2201/0216
See application file for complete search history.

(56) References Cited

U.S. PATENT DOCUMENTS

| | | | |
|---|---|---|---|
| 6,223,880 B1* | 5/2001 | Caspi | B23Q 7/03 198/346.2 |
| 2001/0021337 A1* | 9/2001 | Murata | B25B 5/061 29/563 |
| 2006/0245860 A1* | 11/2006 | Moriya | H01L 21/67265 414/279 |
| 2007/0215435 A1* | 9/2007 | Tachibana | H01L 25/072 198/339.1 |
| 2008/0181753 A1 | 7/2008 | Bastian et al. | |
| 2011/0048894 A1* | 3/2011 | Doane | B65G 47/506 198/460.1 |
| 2011/0083939 A1* | 4/2011 | Huber | B65G 47/084 198/418 |
| 2014/0172155 A1* | 6/2014 | Neiser | B65G 43/08 700/230 |
| 2014/0249666 A1 | 9/2014 | Radwallner et al. | |
| 2016/0167888 A1* | 6/2016 | Messina | B65G 41/008 198/315 |
| 2016/0221762 A1* | 8/2016 | Schroader | B65G 47/31 |
| 2017/0152106 A1* | 6/2017 | Hofmann | B65G 1/1378 |
| 2018/0158016 A1* | 6/2018 | Pandya | G05B 19/41895 |
| 2019/0333006 A1* | 10/2019 | Velten | G05D 1/0225 |
| 2019/0367278 A1* | 12/2019 | Bellar | B65G 1/1376 |
| 2019/0375590 A1* | 12/2019 | Gravelle | B65G 1/1373 |
| 2020/0031578 A1 | 1/2020 | Lisso et al. | |
| 2020/0125109 A1* | 4/2020 | Velten | B65G 65/00 |
| 2020/0324974 A1* | 10/2020 | Gorman | G06Q 10/04 |

FOREIGN PATENT DOCUMENTS

| | | |
|---|---|---|
| CN | 108438698 A | 8/2018 |
| CN | 108858179 A | 11/2018 |
| CN | 109074080 A | 12/2018 |
| CN | 110065750 A | 7/2019 |
| CN | 110065751 A | 7/2019 |
| CN | 110142763 A | 8/2019 |
| CN | 110147970 A | 8/2019 |
| CN | 110422529 A | 11/2019 |
| CN | 110472903 A | 11/2019 |
| CN | 110727272 A | 1/2020 |
| CN | 110733820 A | 1/2020 |
| CN | 210029133 U | 2/2020 |
| CN | 110976306 A | 4/2020 |
| CN | 111099374 A | 5/2020 |
| CN | 111573112 A | 8/2020 |
| CN | 111776584 A | 10/2020 |
| CN | 112193704 A | 1/2021 |
| CN | 213444513 U | 6/2021 |
| CN | 113581713 A | 11/2021 |
| CN | 113581714 A | 11/2021 |
| EP | 3020663 A1 | 5/2016 |
| EP | 3591487 A1 | 1/2020 |
| JP | 2002297239 A | 10/2002 |
| JP | 2015196660 A | 11/2015 |
| JP | 7005174 B2 | 1/2022 |
| KR | 20050108022 A | 11/2005 |
| KR | 101180725 B1 | 9/2012 |
| KR | 20150056604 A | 5/2015 |
| KR | 20210145789 A | 12/2021 |
| WO | 2016023869 A2 | 2/2016 |
| WO | 2019138392 A1 | 7/2019 |
| WO | 2019170805 A1 | 9/2019 |
| WO | 2019233484 A1 | 12/2019 |

OTHER PUBLICATIONS

First Office Action in CN Patent Application No. 202011078312.6 dated May 2, 2021.
Notification to Grant Patent in CN Patent Application No. 202011078312.6 dated Jun. 3, 2021.
Decision to Grant in JP Patent Application No. 2021-166744 dated Jan. 6, 2022.
Notice of Allowance in KR Patent Application No. 10-2021-0125275 dated Feb. 11, 2022.
Chinese Office Action from related Chinese Application No. 202011078312.6, dated Mar. 2, 2021, 36 pages.
Extended European Search Report from related European Application No. 21201848.5, dated Jul. 4, 2022, 11 pages.
Koelewijn Jaap et al, "A Simulation Model for Transport in a Grid-based Manufacturing System", Jun. 22, 2014, pp. 1-7.
Kesen et al, "Simulation of automated guided vehicle (AGV) systems based on just-in-time (JIT) philosophy in a job-shop environment", Simulation Modelling Practice and Theory, Elsevier, Amsterdam, NL, Feb. 11, 2007, vol. 15, No. 3, pp. 272-284.
Kti Simulation, "AGV and Conveyor System for E-Coat (Conveyor Area)", Mar. 5, 2019.
Ssi Schaeffer, "WEASEL Automated Guided Vehicle for Flexible, Internal Transport of Goods", www.ssi-schaefer.com, Jun. 9, 2017, pp. 1-7.
Oin, Y et al., A mobile transfer multi-robots system structure oriente to engineering application, Journal of Central South University (Science and Technology), Jul. 2013, pp. 21-27.
First Office Action in CN Patent Application No. 202110939663.X dated Aug. 16, 2022.
First Office Action in CN Patent Application No. 202110939666.6 dated Aug. 24, 2022.

* cited by examiner

WAREHOUSING SYSTEM, MATERIAL TRANSPORTING METHOD, CONTROL TERMINAL, ROBOT, AND STORAGE MEDIUM

This application claims priority to Chinese Patent Application No. 2020110783126, filed on Oct. 10, 2020, which is hereby incorporated by reference in its entirety.

TECHNICAL FIELD

The present disclosure relates to the field of intelligent warehousing technology and, in particular, to a warehousing system, a material transporting method, a control terminal, a robot and a storage medium.

BACKGROUND

A warehouse for storing materials is commonly provided with a conveyor line for material transportation, which can drive the materials to move, so as to facilitate the transporting of the materials by staff located at different locations of the warehouse.

In the prior art, a work mode where a plurality of workstations share one annular conveyor line for simultaneous material processing is usually adopted. In particular, materials are transported to the conveyor line through a manual transporting manner, or, the materials are fetched and transported by a robot to a vicinity of the conveyor line, and the materials are placed on the conveyor line through a manual unloading manner; and then the materials required by each workstation are sequentially transmitted to a location where each workstation is located through an annular conveyor line, thereby, the staff of each workstation can perform material processing according to work requirements.

However, in the above-described working mode, in one aspect, due to the need of manual transporting or unloading the materials, the material transporting efficiency can be reduced; and in another aspect, due to sharing one conveyor line, the workstation with low material processing efficiency will affect the material conveying efficiency of the whole conveyor line, thereby reducing the overall working efficiency of all workstations.

SUMMARY

The present disclosure provides a warehousing system, a material transporting method, a control terminal, a robot and a storage medium, which are configured to solve problems existing in the prior art.

In one aspect, the present disclosure provides a warehousing system, including: a robot and a control terminal;

the control terminal is configured to send a first control instruction to the robot according to a current task, and the first control instruction includes material fetching information and first destination information; and the robot is configured to execute a material fetching operation according to the material fetching information in the first control instruction, and transport a fetched-out material to a corresponding first destination according to the first destination information;

where the first destination includes different conveyor lines corresponding to different workstations, the robot is specifically configured to dock with a conveyor line to transport a material to the conveyor line, and a workstation is provided with a console for performing processing on the material on the conveyor line.

In another aspect, the present disclosure provides a material transporting method applied to a control terminal, the method including:

acquiring a current task;

sending a first control instruction to a robot according to the current task, where the first control instruction includes material fetching information and first destination information, the first control instruction is used to instruct the robot to perform a material fetching operation according to the material fetching information in the first control instruction, and to transport a fetched-out material to a corresponding first destination according to the first destination information;

where the first destination includes different conveyor lines corresponding to different workstations, the first control instruction is specifically used to instruct the robot to dock with a conveyor line to transport a material to the conveyor line, and a workstation is provided with a console for performing processing on the material on the conveyor line.

In another aspect, the present disclosure provides a material transporting method applied to a robot, the method including:

receiving a first control instruction sent by a control terminal according to a current task, where the first control instruction includes material fetching information and first destination information; and performing a material fetching operation according to the material fetching information in the first control instruction, and transporting a fetched-out material to a corresponding first destination according to the first destination information;

where the first destination includes different conveyor lines corresponding to different workstations, after transporting the material to the first destination, docking with the conveyor line to transport the material to the conveyor line, and the workstation is provided with a console for performing processing a material on the conveyor line.

In another aspect, the present disclosure provides a control terminal, including:

at least one processor; and a memory connected in a communicational way to the at least one processor;

where the memory has instructions that can be executed by the at least one processor stored thereon, and the instructions are executed by the at least one processor to cause the control terminal to execute the methods described above.

In another aspect, the present disclosure provides a robot, including:

at least one processor; and a memory connected in a communicational way to the at least one processor;

where the memory has instructions that can be executed by the at least one processor stored thereon, and the instructions are executed by the at least one processor to cause the robot to execute the methods described above.

In another aspect, the present disclosure provides a computer-readable storage medium, where the computer-readable storage medium has computer-executable instructions stored thereon, and the computer-executable instructions, when executed by a processor, are configured to implement the methods described above.

The present disclosure provides the warehousing system, the material transporting method, the control terminal, the robot and the storage medium, where the warehousing system includes: a robot and a control terminal; the control terminal is configured to send a first control instruction to the robot according to the current task, and the first control instruction includes material fetching information and first destination information; and the robot is configured to execute a material fetching operation according to the material fetching information in the first control instruction, and transport the fetched-out material to the corresponding first destination according to the first destination information; where the first destination includes different conveyor lines corresponding to different workstations, the robot is specifically configured to dock with the conveyor line to transport the material to the conveyor line, and a workstation is provided with a console for performing processing on the material on the conveyor line. In the present disclosure, the robot performs material fetching according to the control instruction of the control terminal, transports the material to the destination and automatically docks with the conveyor line at the destination, so that the material is automatically transported to the conveyor line. Manual participation is not needed in the material transporting process, therefore material transporting efficiency can be improved; besides, by configuring different conveyor lines corresponding to different workstations, the material conveying of each workstation does not affect each other, and the workstation with low material processing efficiency does not cause effect on other workstations, thereby facilitating to improve overall work efficiency of all workstations.

BRIEF DESCRIPTION OF DRAWINGS

The accompanying drawings herein, which are incorporated in the specification and constitute a part of the specification, illustrate embodiments consistent with the present disclosure and, together with the specification, serve to explain the principles of the present disclosure.

Figure 1:
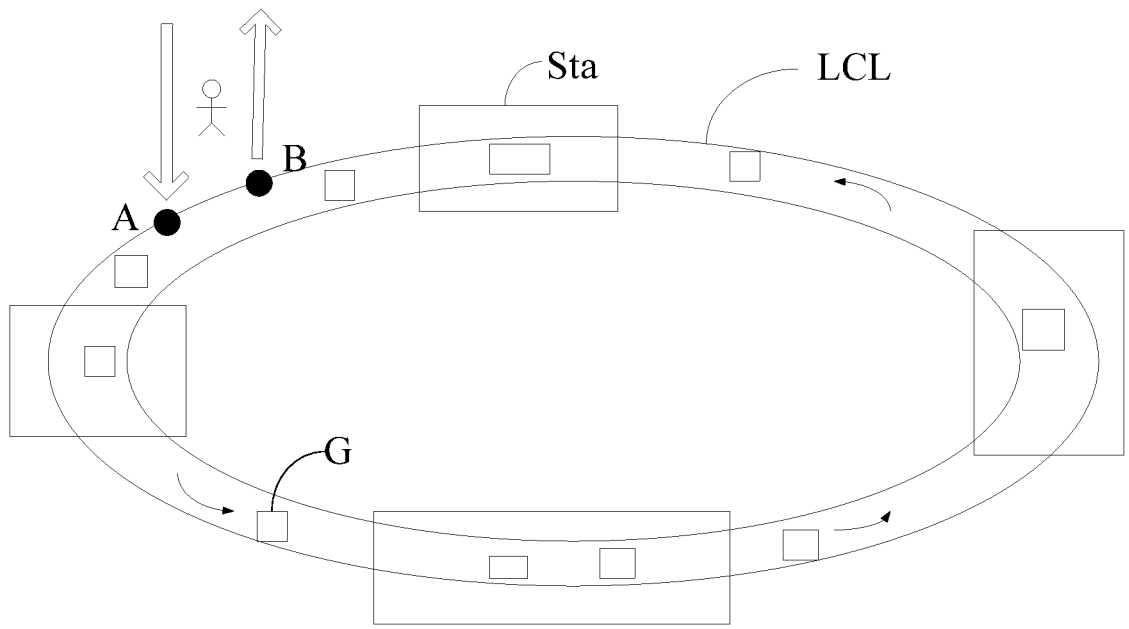
FIG. 1 is a schematic diagram of a plurality of workstations of a warehousing system sharing one annular conveyor line and simultaneously performing material processing in the prior art.

The explicit embodiments of the present disclosure that have been illustrated by the above accompanying drawings, which will be described in more detail hereinafter. These accompanying drawings and literal descriptions are not intended to limit, in any way, the scope of the conception of the present disclosure, but to illustrate the concept of the present disclosure for those skilled in the art through referring to particular embodiments.

DESCRIPTION OF EMBODIMENTS

In order to make purposes, technical solutions and advantages of the embodiments of the present disclosure more clear, the technical solutions of the embodiments in the present disclosure will be clearly and completely described in combination with the accompanying drawings in the embodiments of the present disclosure, obviously, the embodiments described are part of the embodiments of the present disclosure, rather than all embodiments. Based on the embodiments of the present disclosure, all other embodiments obtained by those of ordinary skilled in the art without creative work shall fall within the protection scope of the present disclosure.

The terms used in the embodiments of the present disclosure are merely for the purpose of describing particular embodiments and are not intended to limit the present disclosure. As used in the embodiments of the present disclosure, the singular forms "a/an" and "the" are intended to include plural forms, unless the context clearly indicates other meanings.

It should be understood that the term "and/or" as used herein is merely an association relationship that describes an associated object, which indicates that there may be three relationships, for example, A and/or B, which may indicate there cases: A exists alone, A and B exist at the same, and B exists alone. In addition, the character "I" herein generally indicate that associated objects before and after are in an "or" relationship.

Depending on the context, the word "if" and "in case of" as used herein may be interpreted as "at the time" or "when" or "in response to determining" or "in response to detecting". Similarly, depending on the context, the phrase "if determining" or "if detecting (a stated condition or event)" may be interpreted as "when determining" or "in response to determining" or "when detecting (a stated condition or event)" or "in response to detecting (a stated condition or event)".

It should also be noted that the terms "includes", "comprise" or any other variation thereof are intended to cover a non-exclusive inclusion, thereby causing a commodity or a system that include a series of elements not only to include those elements but also to include other elements that are not explicitly listed, or to also include elements inherent to such commodity or system. In situations of the absence of more constraints, the elements defined by statement "includes a . . . " do not preclude the presence of additional identical elements in the commodity or the system that includes the element.

FIG. 1 is a schematic diagram of a plurality of workstations of a warehousing system sharing one annular conveyor line and simultaneously performing material processing in the prior art. As shown in FIG. 1, the warehousing system includes a loop conveyor line (loop conveyor line, LCL) and a plurality of workstations (workstation, Sta). The annular conveyor line drives material G (such as goods G or article G) to move along the direction of the arrow in the annular conveyor line, and the plurality of workstations share the annular conveyor line to perform material processing. Where the annular conveyor line is provided with a material-loading position A and a material-unloading position B, firstly, the material is transported to the material-loading position A and transferred to the annular conveyor line through a manual transporting manner, or the material are fetched and conveyed to the vicinity of the material-loading position A through the robot, and the material are placed on the annular conveyor line through a manual unloading manner. Then the material required by each workstation is sequentially transmitted to the location where each workstation is located through the annular conveyor line, thereby the staff of each workstation can perform material processing according to work requirements. The material which has been processed is transported to the material-unloading position B under an action of the annular conveyor line, and the staff can transport the material that has been processed off the annular conveyor line at the material-unloading position B.

However, in the above-mentioned working mode, in one aspect, because manual material transporting or manual material unloading is required, when the materials are large, the material transporting efficiency will be reduced due to restriction of the physical capability of the staff. In another aspect, because of sharing one conveyor line, the workstation with low material processing efficiency can affect the material conveying efficiency of the whole conveyor line, thereby reducing the overall working efficiency of all workstations.

The warehousing system, the material transporting method, the control terminal, the robot and the storage medium provided by the present disclosure are aimed to solve the above technical problems in the prior art.

The present disclosure provides a warehousing system, a material transporting method, a control terminal, a robot and a storage medium, where the warehousing system includes: a robot and a control terminal; where the robot performs material fetching according to a control instruction of a control terminal, transports the material to a destination, and automatically docks with the conveyor line at the destination, so that the material is automatically transported to the conveyor line. Manual participation is not needed in the material transporting process, therefore material transporting efficiency can be improved; besides, by arranging different conveyor lines corresponding to different workstations, the material conveying of each workstation does not affect each other, and the workstation with low material processing efficiency does not cause effect on other workstations, thereby facilitating to improve the overall work efficiency of all workstations.

The technical solutions of the present disclosure and how the technical solutions of the present disclosure solve the above technical problems will be described in detail below with specific embodiments. The following several specific embodiments may be combined with each other, as for the same or similar concepts or processes, description may not be repeated in some embodiments. Embodiments of the present disclosure will be described below in combination with the accompanying drawings.

A warehousing system is provided in some embodiments.

Figure 2:
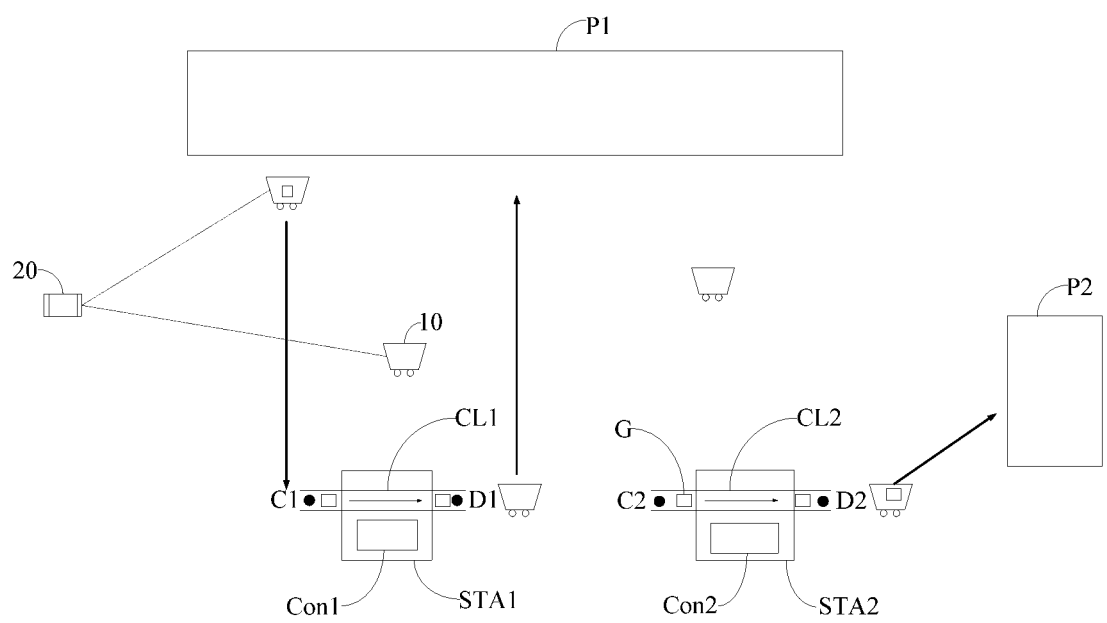
FIG. 2 is a schematic diagram of a warehousing system in an embodiment of the present disclosure.

FIG. 2 is a schematic diagram of a warehousing system in an embodiment of the present disclosure, as shown in FIG. 2, the warehousing system includes a robot 10 and a control terminal 20, and the control terminal 20 can communicate with the robot 10, so as to control the robot 10 to move. A manner in which the control terminal 20 communicates with the robot 10 includes, but is not limited to, Wi-Fi, bluetooth, Zigbee, NFC (near field communication), or RFID (radio frequency identification), etc.

In addition, the warehousing system also includes a plurality of workstations, such as workstations STA1, STA2, etc. in FIG. 1. Different workstations (STA) correspond to different conveyor lines (CL), and a console (Con) is arranged in each workstation. For example, the workstation STA1 in FIG. 1 corresponds to a conveyor line CL1, and the staff can perform processing on the material G on the conveyor line CL1 through the console Con1; and the workstation STA2 corresponds to the conveyor line CL2, and the staff can perform processing on the material G on the conveyor line CL2 through the console Con2.

It can be understood that the different conveyor lines corresponding to the different workstations work independently and do not affect each other, i.e., the material conveying speed of the conveyor line CL2 corresponding to the workstation STA2 is not affected when the material conveying speed of the conveying line CL1 is slow due to low material transporting efficiency of the workstation STA1.

Besides, the warehousing system further includes a material placing area P1, and the material placing area P1 is internally provided with a shelf for storing materials and the like. The robot 10 may go to the placing area P1 to fetch the material.

In particular, when performing material processing, the control terminal 20 is used to send a first control instruction to the robot 10 according to a current task, and the first control instruction includes the material fetching information and the first destination information. Where the material fetching information includes material type information and/or the location information of the material in the material placing area P1, such that the robot 10 can complete the material fetching operation according to the material fetching information. The first destination information includes destination location information of the robot 10 transporting materials, and the first destination includes different conveyor lines corresponding to different workstations, therefore, the robot 10 may transport the fetched-out material to different conveyor lines, so that different workstations perform material processing.

Correspondingly, after receiving the first control instruction sent by the control terminal 20, the robot 10 is used to go to the material placing area P1 to perform a material fetching operation according to the material fetching information in the first control instruction, and transport the fetched-out material to the corresponding first destination according to the first destination information. Besides, after transporting the material to the conveyor line, the robot 10 is also used to dock with the conveyor line to transport the material to the conveyor line. Therefore, the robot 10 can transport the fetched-out material to different conveying lines, so that different workstations perform material processing.

This embodiment provides a warehousing system. The robot 10 performs material fetching according to a control instruction of the control terminal 20, transports the material to a destination, and automatically docks with the conveyor line at the destination, so that the material is automatically transported to the conveyor line. Manual participation is not needed in the material transporting process, therefore material transporting efficiency can be improved; besides, by arranging different conveyor lines corresponding to different workstations, the material conveying of each workstation does not affect each other, and the workstation with low material processing efficiency does not cause effect on other workstations, thereby facilitating to improve the overall work efficiency of all workstations.

In some embodiments, the conveyor line includes a conveyor line inlet. The robot is configured to transport the fetched-out material to the corresponding conveyor line inlet according to first destination information, and docks with the conveyor line at the conveyor line inlet to place the material on the conveyor line, so that the material is moved to the console under the action of the conveyor line.

In particular, the conveyor line CL includes a conveyor line inlet C, for example, with reference to FIG. 2, the conveyor line CL1 includes a conveyor line inlet C1, and the conveyor line CL2 includes a conveyor line inlet C2, etc. After completing the material fetching process, the robot transports the fetched-out material to the corresponding conveyor line inlet C according to the first destination information, and docks with the conveyor line CL to place the material on the conveyor line CL at the conveyor line inlet C, so that the material is moved to the console Con under the action of the conveyor line, thereby, the staff can perform processing on the material on the console.

In this embodiment, the robot conveys the fetched-out material to the corresponding conveyor line inlet, and docks with the conveyor line at the conveyor line inlet to place the material on the conveyor line, thereby achieving conveying the material to be processed and automatic processing of transferring the material to the conveyor line, and facilitating to improve the material transporting and material processing efficiency.

In some embodiments, the conveyor line includes a conveyor line outlet, and the material that has been processed via the console is moved to the conveyor line outlet under the action of the conveyor line.

The control terminal is further configured to send a second control instruction to the robot, and the second control instruction includes the outlet location information and the second destination information; and the robot is configured to move to the corresponding conveyor line outlet according to the outlet location information in the second control instruction, dock with the conveyor line at the conveyor line outlet to fetch out the material that has been processed on the conveyor line, and transport the material that has been processed to the corresponding second destination according to the second destination information.

In particular, the conveyor line CL includes a conveyor line outlet D, for example, with reference to FIG. 2, the conveyor line CL1 includes a conveyor line outlet D1, and the conveyor line CL2 includes a conveyor line outlet D2, etc. The robot, after receiving the second control instruction, moves to the corresponding conveyor line outlet D according to the outlet location information in the second control instruction, docks with the conveyor line CL at the conveyor line outlet D to fetch out the material that has been processed on the conveyor line, and then transports the material that has been processed to the corresponding second destination according to the second destination information.

It can be appreciated that the robot that receives the second control instruction may be an unoccupied robot, or a robot that transports the material to the conveyor line inlet and places all materials on the conveyor line, which is not limited herein.

In this embodiment, the robot moves to the corresponding conveyor line outlet according to the outlet location information, docks with the conveyor line at the conveyor line outlet to fetch out the material that has been processed on the conveyor line, thereby achieving automatic processing of fetching the material out from the conveyor line as well as transporting the material which has been processed, and facilitating to improve efficiency of material transporting as well as material processing.

In some embodiments, the second destination includes a shelf for storing materials or a material outbound location.

The robot, after fetching out the processed material at the conveyor line outlet, transports the processed material to the second destination, where depending on the different types of the material processing, the location of the second destination is different.

In particular, when the material processing task is material sorting, the second destination may specifically be a shelf for storing materials, that is, the material placing area P1 in FIG. 2. Therefore, after the staff completes the sorting processing on the material, the robot places the material back to the shelf of the material placing area P1, thereby facilitating a next material sorting.

When the material processing task is a material outbound processing, the second destination may also be a material outbound site, that is, the material outbound area P2 in FIG. 2. Therefore, after the staff completes the outbound processing on the material, the robot transports the material to the material outbound area P2, thereby facilitating performing material outbound.

In this embodiment, depending on the different types of the material processing, the location of the second destination is different, which can be selected according to the actual requirements. For example, when the material processing task is material sorting, the second destination may specifically be a shelf for storing materials, thereby facilitating the next material sorting; and when the material processing task is material outbound processing, the second destination may also be a material outbound location, thereby facilitating performing material outbound.

In some embodiments, the conveyor line includes a conveyor line inlet and a conveyor line outlet.

Figure 3:
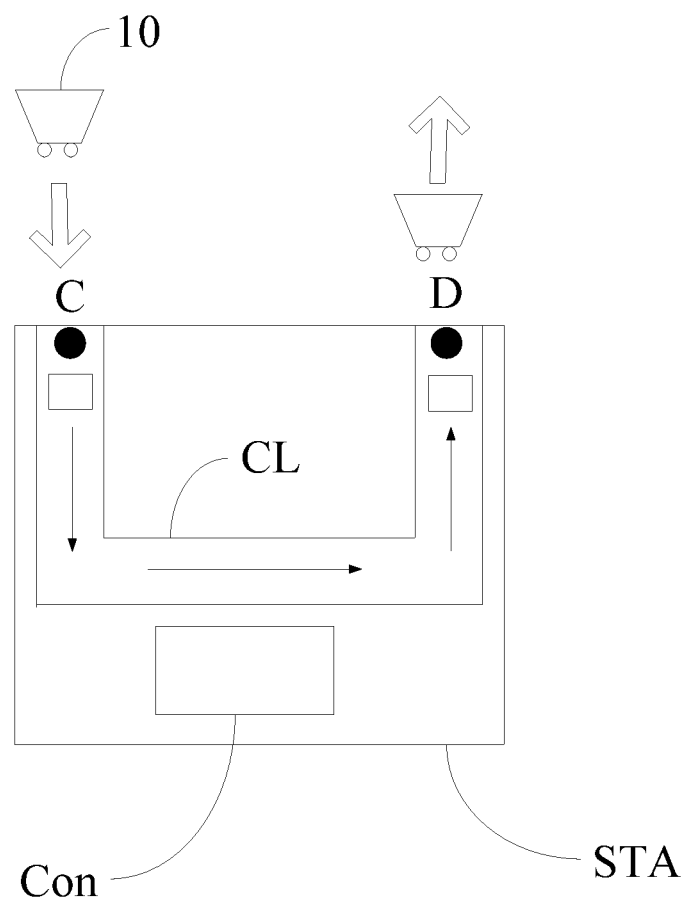
FIG. 3 is a schematic diagram of a conveyor line that includes one conveyor line inlet and one conveyor line outlet in an embodiment of the present disclosure.

FIG. 3 is a schematic diagram of a conveyor line that includes one conveyor line inlet and one conveyor line outlet in an embodiment of the present disclosure, as shown in FIG. 3, the conveyor line may be a U-shaped structure. In the case that a single material is actually processed for a long time, if the pace of the robot placing the material on the conveyor line is faster than the pace of the material processing, the conveyor line of the U-shaped structure may be adopted to prolong the path length of the material conveying.

It can be appreciated that the structure of the conveyor line may also be other shapes, such as an N shape or a wave shape, so long as the path length of the material conveying can be prolonged.

In this embodiment, through prolonging the path length of the material conveying, the balance between the pace of the material processing and the pace that the robot places the material can be ensured, thereby ensuring the material processing efficiency of the workstation.

In some embodiments, when the conveyor line corresponding to the workstation includes a plurality of conveyor line inlets, the control terminal is configured to determine a first target inlet which is not currently parked with a robot from the plurality of conveyor line inlets, take the first target inlet as a first destination corresponding to the robot, and send a first control instruction including the first destination information to the robot; and the robot is configured to, after completing the material fetching operation, transport the fetched-out material to the first target inlet according to the first destination information.

Figure 4:
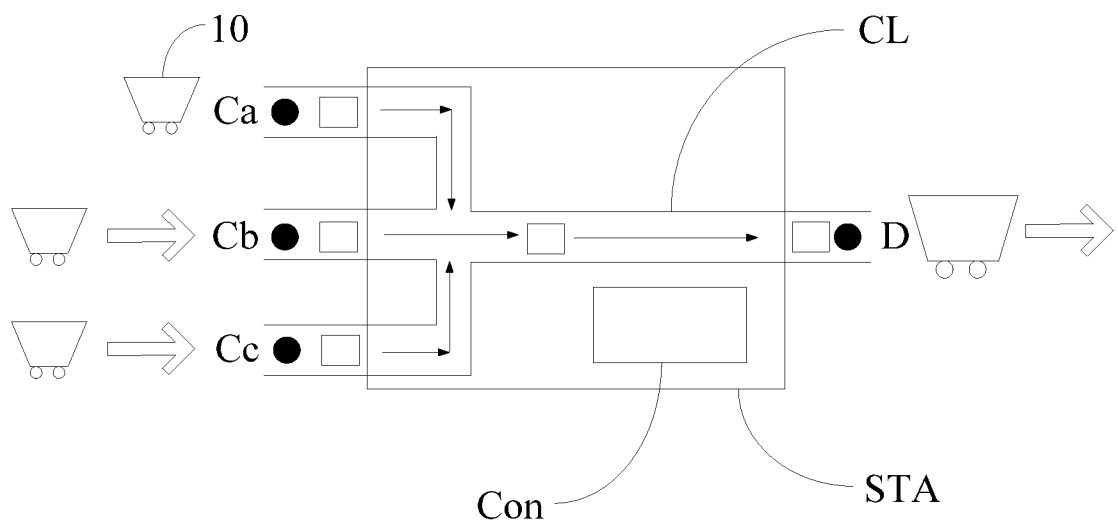
FIG. 4 is a schematic diagram of a conveyor line that includes a plurality of conveyor line inlets in an embodiment of the present disclosure.

FIG. 4 is a schematic diagram of a conveyor line that includes a plurality of conveyor line inlets in an embodiment of the present disclosure, as shown in FIG. 4, the conveyor line includes conveyor line inlets Ca, Cb and Cc (other quantities are also possible). In the case that the single material is actually processed for a short time, if the pace of the robot placing the material on the conveyor line is slower than the pace of the material processing, the conveyor line structure with a plurality of conveyor line inlets may be adopted to increase the placing quantity of the material.

When the quantity of the conveyor line inlets is multiple, the control terminal can select the conveyor line inlet where no robot is currently parked as the first target inlet, i.e., the first target inlet is currently in a unoccupied state, thereby, the robot can transport the material to the first target inlet and automatically place the material on the conveyor line.

For example, if the conveyor line inlet Ca is currently parked with a robot, the conveyor line inlets Cb and Cc are not currently parked with robots, the control terminal may take the Cb or Cc as the first target inlet.

In this embodiment, the control terminal determines a first target inlet which is not currently parked with a robot from the plurality of conveyor line inlets, causing that the robot can immediately perform an operation of placing material on the conveyor line after going to the first target inlet, thereby ensuring the material transporting efficiency, and avoiding a situation that the robot is congested.

In some embodiments, when the conveyor line includes a single conveyor line outlet, the control terminal is specifically configured to determine a first target inlet that is nearest to the single conveyor line outlet and which is not currently parked with a robot from the plurality of conveyor line inlets.

Figure 5:
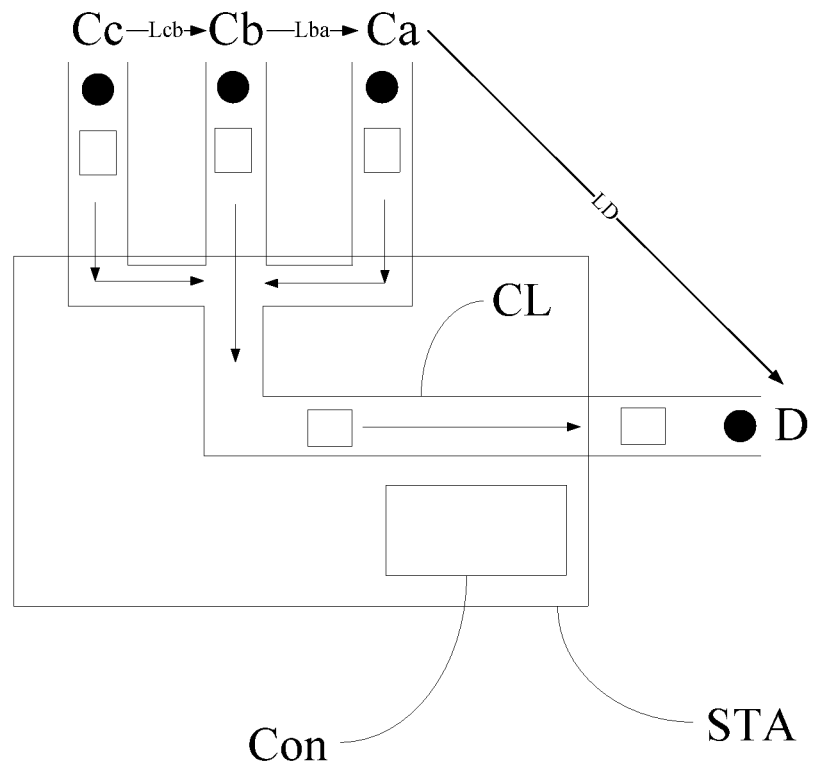
FIG. 5 is a schematic diagram of a conveyor line that includes a plurality of conveyor line inlets and a single conveyor line outlet in an embodiment of the present disclosure.

FIG. 5 is a schematic diagram of a conveyor line that includes a plurality of conveyor line inlets and a single conveyor line outlet in an embodiment of the present disclosure, as shown in FIG. 5, the conveyor line includes conveyor line inlets Ca, Cb and a Cc (other quantities are also possible), and further includes a single conveyor line outlet D.

When the control terminal determines the first target inlet, in addition to requiring that the conveyor line inlet is not currently parked with a robot, the control terminal also requires that the conveyor line inlet is nearest to the single conveyor line outlet. Thereby, when the robot receiving the second control instruction is a robot for transporting materials to the conveyor line inlet and places all materials on the conveyor line, the distance between the robot and the single conveyor line outlet can be ensured to be shortest.

For example, with reference to FIG. 5, when the conveyor line inlets Ca, Cb and Cc are not parked with a robot, the distance that the robot goes from the Ca to the single conveyor line outlet D is LD, the distance that the robot goes from the Cb to the single conveyor line outlet D is Lba+LD, and the distance that the robot goes from the Cc to the single conveyor line outlet D is Lcb+Lba+LD, that is, the Ca is nearest to the single conveyor line outlet. Therefore, the control terminal determines that the conveyor line inlet Ca is the first target inlet.

Besides, by selecting the conveyor line inlet that is nearest to the single conveyor line outlet and which is not currently parked with a robot as the first target inlet, the situation that the robot is blocked by other robots on the path to the single conveyor line outlet can be avoided.

For example, in the case that the conveyor line inlets Ca, Cb, and Cc are not parked with a robot, if the control device determines that the first target inlet corresponding to the first robot is Ca, and the first target inlet corresponding to the second robot transporting the material after the first robot is Cb, after the first robot places all materials on the conveyor line, the first robot goes to the single conveyor line outlet D according to the shortest path of the LD, and at this moment, the Ca is not parked with a robot. After the second robot places all materials on the conveyor line, the second robot goes to a single conveyor line outlet D according to the shortest path of the Lba+LD, and there is no other robots obstructing the path, therefore the distance between the second robot and the single conveyor line outlet D can be ensured to be shortest.

In this embodiment, when the conveyor line includes a single conveyor line outlet, the control terminal determines the first target inlet to be nearest to a single conveyor line outlet and is not currently parked with the robot from the plurality of conveyor line inlets, thereby ensuring the distance between the robot and the single conveyor line outlet to be shortest, and avoiding the situation that the robot is blocked by other robots on the path to the single conveyor line outlet.

In some embodiments, when the conveyor line includes a plurality of conveyor line outlets, the control terminal is specifically configured to determine a first target inlet which is nearest to the farthest conveyor line outlet and is not currently parked with a robot from the plurality of conveyor line inlets, and the farthest conveyor line outlet is a conveyor line outlet that is farthest from the console in the plurality of conveyor line outlets.

Figure 6:
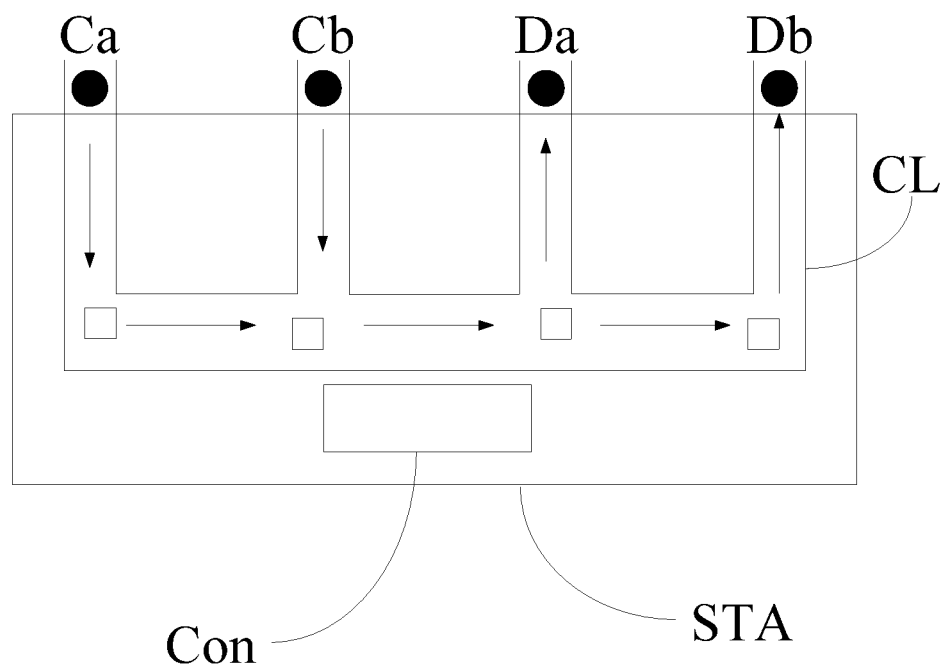
FIG. 6 is a schematic diagram of a conveyor line that includes a plurality of conveyor line inlets and a plurality of conveyor line outlets in an embodiment of the present disclosure.

FIG. 6 is a schematic diagram of a conveyor line that includes a plurality of conveyor line inlets and a plurality of conveyor line outlets in an embodiment of the present disclosure, as shown in FIG. 6, the conveyor line includes conveyor line inlets Ca and Cb, additionally, further includes conveyor line outlets Da and Db. It can be understood that the conveyor line inlets and the conveyor line outlets can also be of other quantities.

When the control terminal determines the first target inlet, in addition to requiring that the conveyor line inlet is not currently parked with a robot, it further requires that the conveyor line inlet is nearest to the farthest conveyor line outlet. Therefore, when the robot that receives the second control instruction is a robot that transports materials to the conveyor line inlet and places all materials on the conveyor line, it can be ensured that, after the current robot moves to the conveyor line outlet, the subsequent robot is prevented from moving to other conveyor line outlets.

For example, with reference to FIG. 6, in the case that all of the Ca, Cb, Da and Db are not parked with a robot, if the farthest conveyor line outlet is Db, the control device determines that the first target inlet corresponding to the first robot is Cb, the first target inlet corresponding to the second robot which transports the material after the first robot is Ca, after the first robot places all materials on the conveyor line, the first robot goes to the conveyor line outlet, at the moment, the Cb is not parked with a robot. After the second robot places all materials on the conveyor line, the second robot goes to the conveyor line outlet, at the moment, there is no obstacle from other robots on the path where the second robot goes to the conveyor line outlet, therefore the moving efficiency of the robot can be ensured.

In some embodiments, after the robot transports the fetched-out material to the first target inlet and before the robot places all materials on the conveyor line, if there is a second target inlet that a distance between which and a single conveyor line outlet or the farthest conveyor line outlet is smaller than a distance between the first target inlet and the single conveyor line outlet or the farthest conveyor line outlet and which is not currently parked with a robot, the control terminal is further configured to take the second target inlet as a new first destination corresponding to the robot, and send a third control instruction including new first destination information to the robot; and the robot is configured to transport a remaining unplaced material to the second target inlet according to the new first destination information in the third control instruction, and place the remaining unplaced material on the conveyor line at the second target inlet.

In particular, with reference to FIG. 5, if the first target inlet corresponding to the first robot is Ca, and the first target inlet corresponding to the second robot handling which transports materials after the first robot is Cb, after the first robot places all materials on the conveyor line, the first robot goes to the single conveyor line outlet D, at this moment, the Ca is not parked with a robot, and the distance from the Ca to the single conveyor line outlet D is smaller than the distance from the Cb to the single conveyor line outlet D. Therefore, before the second robot places all materials on the conveyor line, the Ca may be taken as the new first destination corresponding to the second robot.

With reference to FIG. 6, if the first target inlet corresponding to the first robot is Cb, and after the first robot, the first target inlet corresponding to the second robot which transports materials is Ca. After the first robot places all materials on the conveyor line, the first robot goes to the conveyor line outlet, at this moment, the Cb is not parked with a robot, and the distance from the Cb to the farthest single conveyor line outlet is smaller than the distance from the Ca to the single conveyor line outlet. Therefore, before the second robot places all materials on the conveyor line, the Cb may be taken as the new first destination corresponding to the second robot.

In this embodiment, the process of material transporting further includes adjusting the first destination of the robot according to the material placing situation of other robots, thereby ensuring that the current stopping location of the robot does no cause effect on the subsequent robot in real time, and ensuring the moving efficiency of the robot.

In some embodiments, when the conveyor line corresponding to the workstation includes a plurality of conveyor line outlets, the control terminal is configured to determine a first target outlet which is not currently parked with a robot from the plurality of conveyor line outlets, after taking the first target outlet as the outlet location of the robot, the control terminal sends a second control instruction including outlet location information to the robot; and the robot is configured to move to the first target outlet according to the outlet location information in the second control instruction, and fetch out the material which has been processed on the conveyor line at the first target outlet.

Figure 7:
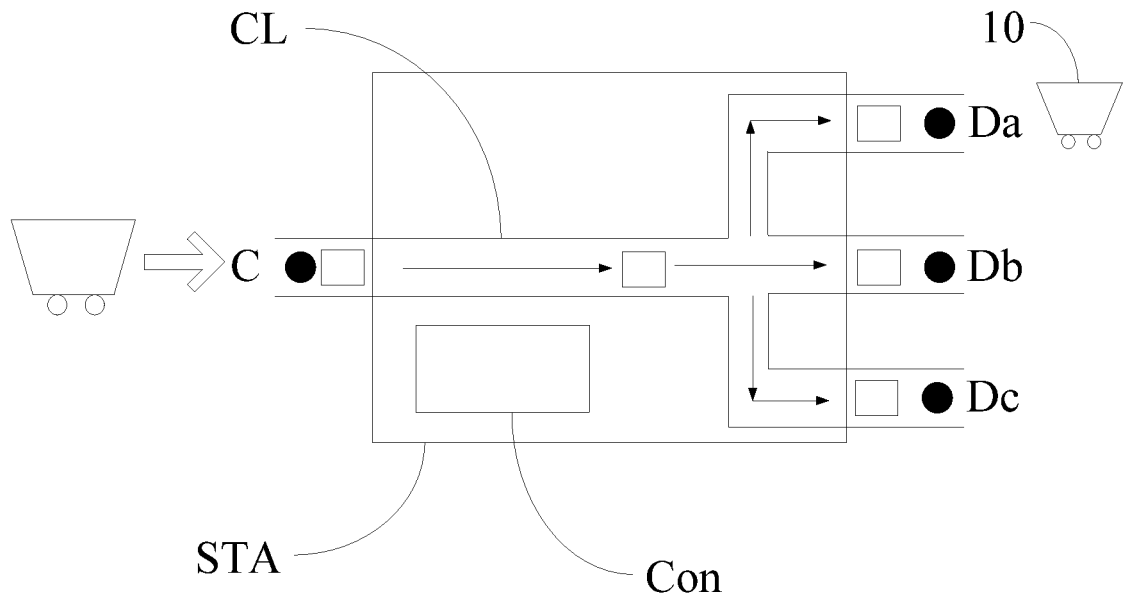
FIG. 7 is a schematic diagram of a conveyor line that includes a plurality of conveyor line outlets in an embodiment of the present disclosure.

FIG. 7 is a schematic diagram of a conveyor line that includes a plurality of conveyor line outlets in an embodiment of the present disclosure, as shown in FIG. 7, the conveyor line includes conveyor line outlets Da, Db and Dc (other quantities are also possible).

When the quantity of the conveyor line outlets is a multiple, the control terminal can select the conveyor line outlet which is not parked with a robot as the first target outlet, i.e., the first target outlet is currently in the unoccupied state. Therefore, the robot can move to the first target outlet and fetch out the material which has been processed on the conveyor line at the first target outlet.

For example, the conveyor line outlet Da is currently parked with a robot, and the conveyor line outlets Db and Dc are not currently parked with robots, then the control terminal may take the Db or Dc as the first target outlet.

In this embodiment, the control terminal determines a first target outlet which is not currently parked with a robot from the plurality of conveyor line outlets, so that the robot can immediately perform the operation of fetching out the material which has been processed on the conveyor line after going to the first target outlet, so as to ensure the material transporting efficiency, and avoid the situation that the robot is congested.

In some embodiments, when the conveyor line includes a single conveyor line inlet, the control terminal is specifically configured to determine a first target outlet that is farthest from the single conveyor line inlet and which is not currently parked with a robot from a plurality of conveyor line outlets.

Figure 8:
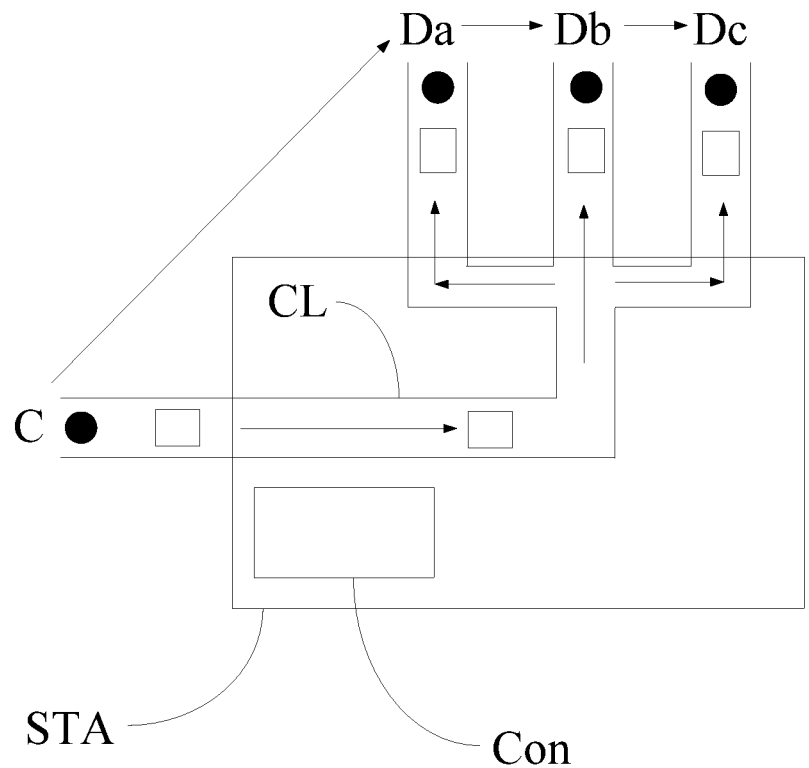
FIG. 8 is a schematic diagram of a conveyor line that includes a plurality of conveyor line outlets and a single conveyor line inlet in an embodiment of the present disclosure.

FIG. 8 is a schematic diagram of a conveyor line that includes a plurality of conveyor line outlets and a single conveyor line inlet in an embodiment of the present disclosure, as shown in FIG. 8, the conveyor line includes conveyor line outlets Da, Db and Dc (other quantities are also possible), additionally, further includes a single conveyor line inlet C.

When the control terminal determines the first target outlet, in addition to requiring that the conveyor line outlet is not currently parked with a robot, it further requires that the conveyor line outlet is farthest from the single conveyor line inlet. Therefore, when the robot that receives the second control instruction is a robot which transports materials to the conveyor line inlet and places all materials on the conveyor line, the situation that after the current robot moves to the conveyor line outlet, the subsequent robot is blocked from moving to other conveyor line outlets can be avoided.

For example, with reference to FIG. 8, in the case that all of the conveyor line outlets Da, Db, and Dc are not parked with a robot, if the control device determines, according to the strategy, that the first target outlet corresponding to the first robot is Dc, and that the first target outlet corresponding to the second robot which transports the material after the first robot is Db, after the first robot places all materials on the conveyor line, the first robot goes to the conveyor line outlet Dc, and after the second robot places all materials on the conveyor line, the second robot goes to the conveyor line outlet Db. Since the distance between the Dc and the single conveyor line inlet C is greater than the distance between the Db and the single conveyor line inlet C, i.e., the first robot is not on the path where the second robot goes to the Db, the situation that the first robot blocks the second robot can be avoided.

In this embodiment, when the conveyor line includes a single conveyor line inlet, the control terminal determines the first target outlet that is farthest from the single conveyor line inlet, and which is not currently parked with a robot from the plurality of conveyor line outlets, thereby avoiding the situation that after the current robot moves to the conveyor line outlet, the subsequent robot is blocked from moving to other conveyor line outlets, and ensuring the moving efficiency of the robot.

In some embodiments, when the conveyor line includes a plurality of conveyor line inlets, the control terminal is specifically configured to determine a first target outlet which is farthest from the nearest conveyor line inlet and which is not currently parked with a robot from the plurality of conveyor line outlets, and the nearest conveyor line inlet is a conveyor line inlet which is nearest to the console in the plurality of conveyor line inlets.

For example, with reference to FIG. 6, the nearest conveyor line inlet is Cb, in the case that the conveyor line outlets Da and Db are both not parked with robots, if the control device determines that the first target outlet corresponding to the first robot is Db according to a strategy, and that the first target outlet corresponding to the second robot which transports the material after the first robot is Da, after the first robot places all materials on the conveyor line, the first robot goes to the conveyor line outlet Db. After the second robot places all materials on the conveyor line, the second robot goes to the conveyor line outlet Da. Since the distance between the Db and the nearest conveyor line inlet Cb is greater than the distance between the Da and the nearest conveyor line inlet Cb, i.e., the first robot is not on the path where the second robot goes to the Da, the situation that the first robot blocks the second robot can be avoided.

In this embodiment, when the conveyor line includes a plurality of conveyor line inlets, the control terminal determines a first target outlet that is farthest to the nearest inlet and which is not currently parked with a robot from the plurality of conveyor line outlets, thereby avoiding the situation that after the current robot moves to the conveyor line outlet, the subsequent robot is blocked from moving to other conveyor line outlets, and ensuring the moving efficiency of the robot.

In some embodiments, after the robot goes to the first target outlet according to the second control instruction, and before satisfying the stopping condition of material fetching, if there is a second target outlet that a distance between which and a single conveyor line inlet or the nearest conveyor line inlet is greater than a distance between the first target outlet and the single conveyor line inlet or the nearest conveyor line inlet and which is not currently parked with a robot, the control terminal is further configured to take the second target outlet as a new outlet location corresponding to the robot, and send a fourth control instruction including new outlet location information to the robot; and the robot is configured to move to the second target outlet according to the new outlet location information in the fourth control instruction, and fetch out the material which has been processed on the conveyor line at the second target outlet.

In particular, with reference to FIG. 8, if the first target outlet corresponding to the first robot is Dc, and the first target outlet corresponding to the second robot which transports the material after the first robot is Db; after the first robot satisfies the stopping condition of material fetching, the first robot leaves the Dc. At this moment, the Dc is not parked with a robot, and the distance between the Dc and the single conveyor line inlet C is greater than the distance between the Db and the single conveyor line inlet C. Therefore, before the second robot satisfies the stopping condition of material fetching, the Dc can be taken as a new outlet location corresponding to the second robot.

With reference to FIG. 6, if the first target outlet corresponding to the first robot is Db, and the first target outlet corresponding to the second robot which transports the material after the first robot is Da; after the first robot satisfies the stopping condition of material fetching, the first robot leaves the Db. At this moment, the Db is not parked with a robot, and the distance between the Db and the nearest conveyor line inlet Cb is greater than the distance between the Da and the nearest conveyor line inlet Cb. Therefore, before the second robot meets the stopping condition of material fetching, the Db can be taken as a new outlet location corresponding to the second robot.

In this embodiment, the process of material transporting further includes adjusting the outlet location corresponding to the robot, thereby ensuring that the current stopping location of the robot does no cause effect on the subsequent robot in real time, and ensuring the moving efficiency of the robot.

In some embodiments, the stopping condition of material fetching includes that the robot has been loaded full with material or there is no material which has been processed on the conveyor line.

In particular, the robot can be provided with a space for storing materials, after the space is loaded full with materials, the robot cannot fetch more materials, at this moment, it can be determined that the stopping condition of material fetching is satisfied.

Besides, if there is no material which has been processed on the conveyor line, it indicates that the robot does not need to fetch more materials, at this moment, it can be determined that the stopping condition of material fetching is satisfied.

In this embodiment, the stopping condition of material fetching includes that the robot is loaded full with materials or there is no material which has been processed on the conveyor line. Therefore, when the stopping condition of material fetching is satisfied, the robot can transport the fetched material to the second destination.

In some embodiments, the robot is provided with a material fetching device, when docking with the conveyor line, the robot transports the material to the conveyor line, or fetches out the material which has been processed on the conveyor line by controlling height of the material fetching structure.

In particular, the material fetching device may be, for example, a transporting assembly, and the robot may dock with the conveyor line by controlling height of the transporting assembly. During docking, the robot minimizes the transporting assembly to ensure the security of the docking process. In addition, the robot can perform operations such as rotating in situ, thereby facilitating performing docking.

Here, how the robot achieves docking with the conveyor line by controlling the height of the transporting assembly will be explained in detail. Firstly, the robot moves to a docking location, during a moving process, there is a possibility that the robot performs deflection. Then, the robot adjusts a pose of its own, e.g., rotating in situ as previously described, or performing a relevant slight adjustment such as shift or deflection towards the docking location, to facilitate docking with the conveyor line. Besides, during the above two operations, the robot adjusts the transporting assembly to a height that causes no interference with the conveyor line. It should be noted that the sequence of the above two operations is merely one example and can be performed in a different sequence or at the same time. Finally, the robot performs docking with the conveyor line, depending on a mode of the docking, the robot can lower/lift the height of the transporting assembly during the docking, so as to enable the transporting assembly to reach a docking height corresponding to height of the conveyor line, so that the robot can dock with the conveyor line or a specific docking structure of the conveyor line. The robot can lower/lift the height of the transporting assembly, so as to form no interference between the robot and the conveyor line. Therefore, the robot can achieve docking with the conveyor line by controlling the height of the transporting assembly while ensuring the security of the docking process.

In some embodiments, a material transporting method is provided, which is applied to a control terminal.

Figure 9:
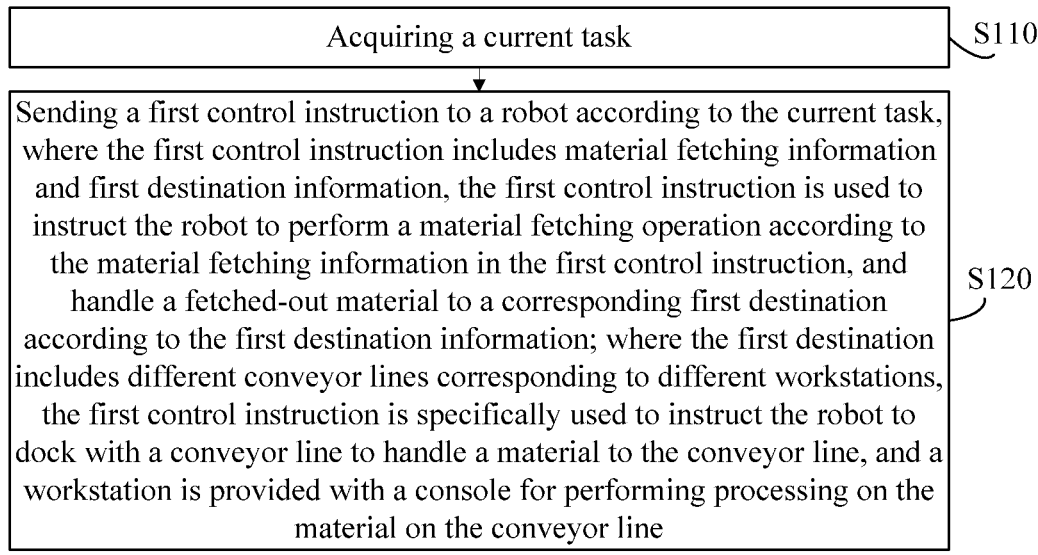
FIG. 9 is a schematic diagram of a material transporting method applied to a control terminal provided by an embodiment of the present disclosure.

FIG. 9 is a schematic diagram of a material transporting method applied to a control terminal provided by an embodiment of the present disclosure, as shown in FIG. 9, the method mainly includes the following steps:

S110, acquiring a current task; and

S120, sending a first control instruction to a robot according to the current task, where the first control instruction includes material fetching information and first destination information, the first control instruction is used to instruct the robot to perform a material fetching operation according to the material fetching information in the first control instruction, and transport a fetched-out material to a corresponding first destination according to the first destination information;

where the first destination includes different conveyor lines corresponding to different workstations, the first control instruction is specifically used to instruct the robot to dock with a conveyor line to transport a material to the conveyor line, and a workstation is provided with a console for performing processing on the material on the conveyor line.

In the present disclosure, the control terminal issues a control instruction to the robot according to the current task, and the robot performs material fetching according to the control instruction of the control terminal, transports the material to the destination and automatically docks with the conveyor line at the destination, so that the material is automatically transported to the conveyor line. Manual participation is not needed in the material transporting process, therefore material transporting efficiency can be improved; besides, by configuring different conveyor lines corresponding to different workstations, the material conveying of each workstation does not affect each other, and the workstation with low material processing efficiency does not cause effect on other workstations, thereby facilitating to improve overall work efficiency of all workstations.

In some embodiments, the method further includes: sending a second control instruction to the robot, where the second control instruction includes outlet location information and second destination information; and the second control instruction is used to instruct the robot to move to the corresponding conveyor line outlet according to the outlet location information in the second control instruction, dock with the conveyor line at the conveyor line outlet to fetch out the material which has been processed on the conveyor line, and transport the material which has been processed to the corresponding second destination according to the second destination information.

In some embodiments, the second destination includes a shelf for storing materials or a material outbound location.

In some embodiments, the method further includes: when the conveyor line corresponding to the workstation includes a plurality of conveyor line inlets, determining a first target inlet which is not currently parked with a robot from the plurality of conveyor line inlets; taking the first target inlet as a first destination corresponding to the robot, and sending the first control instruction including the first destination information to the robot; and the first control instruction is configured to instruct the robot to transport the fetched-out material to the first target inlet according to the first destination information after completing the material fetching operation.

In some embodiments, the determining a first target inlet which is not currently parked with a robot from the plurality of conveyor line inlets specifically includes: when the conveyor line includes a single conveyor line outlet, determining a first target inlet which is nearest to the single conveyor line outlet and is not currently parked with a robot from the plurality of conveyor line inlets; and when the conveyor line includes a plurality of conveyor line outlets, determining a first target inlet that is nearest to the farthest conveyor line outlet and is not currently parked with a robot from a plurality of conveyor line inlets, where the farthest conveyor line outlet is a conveyor line outlet which is farthest from the console in the plurality of conveyor line outlets.

In some embodiments, the method further includes: after the robot transports the fetched-out material to the first target inlet and before the robot places all materials on the conveyor line, if there is a second target inlet that a distance between which and the single conveyor line outlet or the farthest conveyor line outlet is smaller than a distance between the first target inlet and the single conveyor line outlet or the farthest conveyor line outlet and which is not currently parked with a robot, taking the second target inlet as a new first destination corresponding to the robot, and sending a third control instruction including a new first destination information to the robot; and the third control instruction is used to instruct the robot to transport a remaining unplaced material to the second target inlet according to the new first destination information in the third control instruction, and place the remaining unplaced material on the conveyor line at the second target inlet.

In some embodiments, the method further includes: when the conveyor line corresponding to the workstation includes a plurality of conveyor line outlets, determining a first target outlet which is not currently parked with a robot from the plurality of conveyor line outlets; and after taking the first target outlet as an outlet location corresponding to the robot, sending a second control instruction including outlet location information to the robot; and the second control instruction is used to instruct the robot to move to the first target outlet according to the outlet location information in the second control instruction, and fetch out the material which has been processed on the conveyor line at the first target outlet.

In some embodiments, the determining a first target outlet which is not currently parked with a robot from the plurality of conveyor line outlets specifically includes: when the conveyor line includes a single conveyor line inlet, determining a first target outlet which is farthest from the single conveyor line inlet and is not currently parked with a robot from the plurality of conveyor line outlets; and when the conveyor line includes a plurality of conveyor line inlets, determining a first target outlet which is farthest from a nearest conveyor line inlet and is not currently parked with a robot from the plurality of conveyor line outlets, and the nearest conveyor line inlet is a conveyor line inlet which is nearest to the console in the plurality of conveyor line inlets.

In some embodiments, the method further includes: after the robot goes to the first target outlet according to the second control instruction and before satisfying a stopping condition of material fetching, if there is a second target outlet that a distance between which and the single conveyor line inlet or the nearest conveyor line inlet is greater than a distance between the first target outlet and the single conveyor line inlet or the nearest conveyor line inlet and which is not currently parked with a robot, taking the second target outlet as a new outlet location corresponding to the robot, and sending a fourth control instruction including the new outlet location information to the robot; and the fourth control instruction is used to instruct the robot to move to the second target outlet according to the new outlet location information in the fourth control instruction, and fetch out the material which has been processed on the conveyor line at the second target outlet.

In some embodiments, the stopping condition of material fetching includes that the robot has been loaded full with materials or there is no material which has been processed on the conveyor line.

In some embodiments, a material transporting method is provided, which is applied to a robot.

Figure 10:
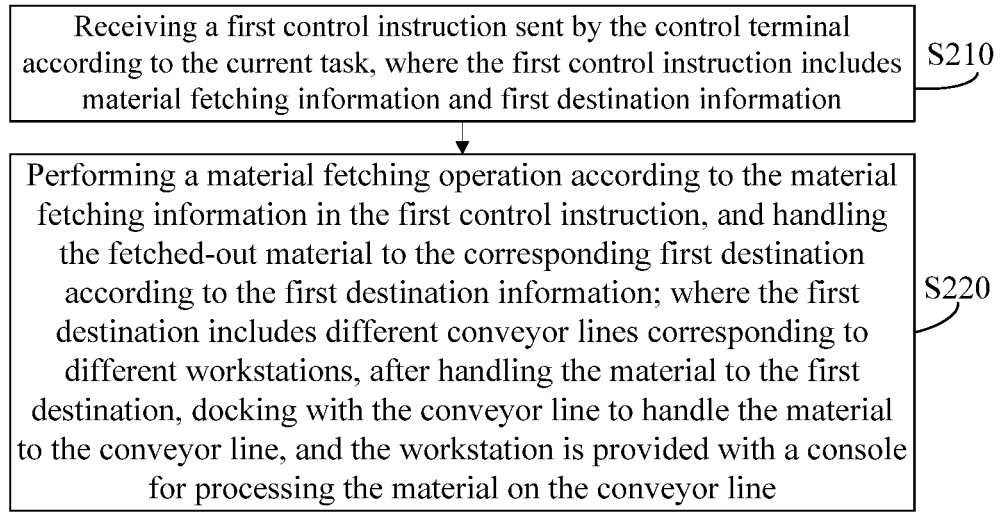
FIG. 10 is a schematic diagram of a material transporting method applied to a robot provided by an embodiment of the present disclosure.

FIG. 10 is a schematic diagram of a material transporting method applied to a robot provided by an embodiment of the present disclosure, as shown in FIG. 10, the method mainly includes the following steps:

S210, receiving a first control instruction sent by the control terminal according to the current task, where the first control instruction includes material fetching information and first destination information;

S220, performing a material fetching operation according to the material fetching information in the first control instruction, and transporting the fetched-out material to the corresponding first destination according to the first destination information; where the first destination includes different conveyor lines corresponding to different workstations, after transporting the material to the first destination, docking with the conveyor line to transport the material to the conveyor line, and the workstation is provided with a console for processing the material on the conveyor line.

In this disclosure, the robot performs material fetching according to the control instruction of the control terminal, transports the material to the destination and automatically docks with the conveyor line at the destination, so that the material is automatically transported to the conveyor line. Manual participation is not needed in the material transporting process, therefore material transporting efficiency can be improved; besides, by configuring different conveyor lines corresponding to different workstations, the material conveying of each workstation does not affect each other, and the workstation with low material processing efficiency does not cause effect on other workstations, thereby facilitating to improve overall work efficiency of all workstations.

In some embodiments, the method further includes: transporting the fetched-out material to a corresponding conveyor line inlet according to the first destination information, and docking with the conveyor line at the conveyor line inlet to place the material on the conveyor line, to cause the material to move to the console under an action of the conveyor line.

In some embodiments, the method further includes: receiving a second control instruction sent by the control terminal, where the second control instruction includes outlet location information and second destination information; and moving to a corresponding conveyor line outlet according to the outlet location information in the second control instruction, docking with the conveyor line at the conveyor line outlet to fetch out a material which has been processed on the conveyor line, and transporting the material which has been processed to a corresponding second destination according to the second destination information.

In some embodiments, the second destination includes a shelf for storing materials or a material outbound location.

In some embodiments, the method further includes: when the first destination information includes a first target inlet, after completing a material fetching operation, transporting the fetched-out material to the first target inlet according to the first destination information.

In some embodiments, the method further includes: receiving a third control instruction sent by the control terminal, where the third control instruction includes a new first destination information, and the new first destination information includes a second target inlet; and transporting a remaining unplaced material to the second target inlet according to the new first destination information in the third control instruction, and placing the remaining unplaced material on the conveyor line at the second target inlet.

In some embodiments, the method further includes: when the outlet location information in the second control instruction includes a first target outlet, moving to the first target outlet according to the outlet location information in the second control instruction, and fetching out the material which has been processed on the conveyor line at the first target outlet.

In some embodiments, the method further includes: receiving a fourth control instruction sent by the control terminal, where the fourth control instruction includes new outlet location information, and the new outlet location information includes a second target outlet; and moving to the second target outlet according to the new outlet location information in the fourth control instruction, and fetching out the material which has been processed on the conveyor line at the second target outlet.

In some embodiments, the method further includes: when docking with the conveyor line, transporting the material to the conveyor line or fetching out the material which has been processed on the conveyor line by controlling height of the material fetching structure.

In one embodiment, a process of the control terminal performing communication with the robot is explained and illustrated.

Figure 11:
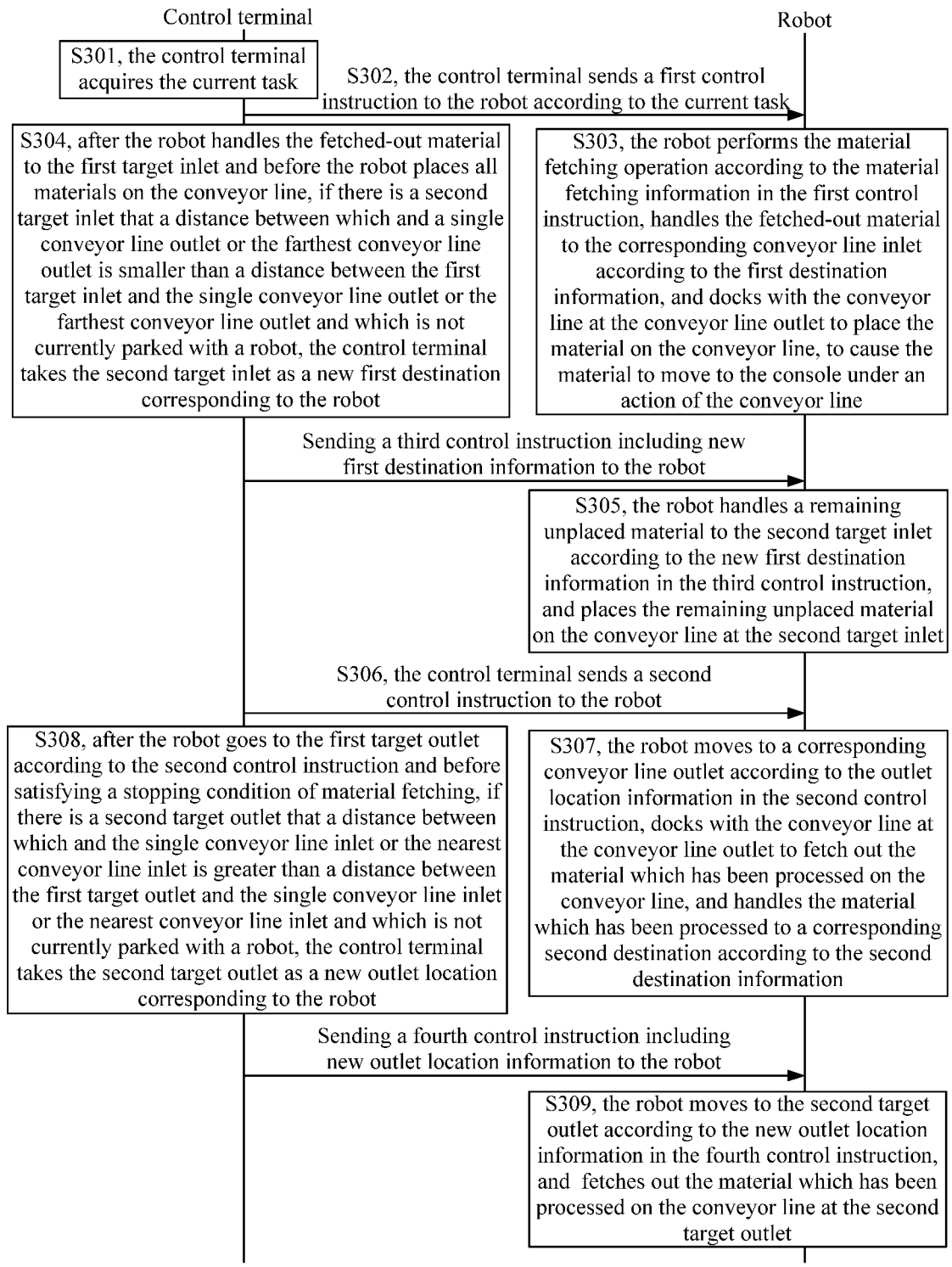
FIG. 11 is a timing diagram of a control terminal performing communicating with a robot in an embodiment of the present disclosure.

FIG. 11 is a timing diagram of a control terminal performing communicating with a robot in an embodiment of the present disclosure, as shown in FIG. 11, the process of the control terminal performing communication with the robot includes the following steps:

S301, the control terminal acquires the current task;

S302, the control terminal sends a first control instruction to the robot according to the current task, where the first control instruction includes material fetching information and first destination information;

S303, the robot performs the material fetching operation according to the material fetching information in the first control instruction, transports the fetched-out material to the corresponding conveyor line inlet according to the first destination information, and docks with the conveyor line at the conveyor line outlet to place the material on the conveyor line, to cause the material to move to the console under an action of the conveyor line;

S304, after the robot transports the fetched-out material to the first target inlet and before the robot places all materials on the conveyor line, if there is a second target inlet that a distance between which and a single conveyor line outlet or the farthest conveyor line outlet is smaller than a distance between the first target inlet and the single conveyor line outlet or the farthest conveyor line outlet and which is not currently parked with a robot, the control terminal takes the second target inlet as a new first destination corresponding to the robot, and sends a third control instruction including new first destination information to the robot;

S305, the robot transports a remaining unplaced material to the second target inlet according to the new first destination information in the third control instruction, and places the remaining unplaced material on the conveyor line at the second target inlet;

S306, the control terminal sends a second control instruction to the robot, where the second control instruction includes outlet location information and second destination information;

S307, the robot moves to a corresponding conveyor line outlet according to the outlet location information in the second control instruction, docks with the conveyor line at the conveyor line outlet to fetch out the material which has been processed on the conveyor line, and transports the material which has been processed to a corresponding second destination according to the second destination information;

S308, after the robot goes to the first target outlet according to the second control instruction and before satisfying a stopping condition of material fetching, if there is a second target outlet that a distance between which and the single conveyor line inlet or the nearest conveyor line inlet is greater than a distance between the first target outlet and the single conveyor line inlet or the nearest conveyor line inlet and which is not currently parked with a robot, the control terminal takes the second target outlet as a new outlet location corresponding to the robot, and sends a fourth control instruction including new outlet location information to the robot;

S309, the robot moves to the second target outlet according to the new outlet location information in the fourth control instruction, and fetches out the material which has been processed on the conveyor line at the second target outlet.

It should be understood that although the steps in the flowchart in the above-described embodiments are shown in sequence indicated by the arrows, these steps are not necessarily executed sequentially in the order indicated by the arrows. Unless explicitly illustrated herein, the execution of these steps is not limited by a strict order, which may be executed in other orders. Moreover, at least part of the steps in the figures may include multiple sub-steps or multiple stages, and these sub-steps or stages are not necessarily executed at the same time, but may be performed at different times. The executing order may not necessarily be performed sequentially. Instead, it may be executed in turn or alternately with other steps or at least a part of the sub-steps or stages of other steps.

In some embodiments, a control terminal is provided, including: at least one processor; and a memory connected in a communicational way to the at least one processor; where the memory has instructions that can be executed by the at least one processor stored thereon, and the instructions are executed by the at least one processor to cause the control terminal to execute the methods described above.

In some embodiments, a robot is provided, including: at least one processor; and a memory connected in a communicational way to the at least one processor; where the memory has instructions that can be executed by the at least one processor stored thereon, and the instructions are executed by the at least one processor to cause the robot to execute the methods described above.

In the control terminal or the robot described above, the memory and the processor are directly or indirectly electrically connected to each other to achieve the transmission or interaction of data. For example, these elements may be electrically connected to each other through one or more communication buses or signal lines, for example, may be connected through a bus. The memory has computer executing instructions achieving data access control method stored thereon, which include at least one software function module which can be stored in a memory in the form of software or firmware, and the processor executes various functional applications and data processing by running software programs and modules stored in the memory.

The memory may be, but is not limited to, a random access memory (random access memory, referred to as RAM), a read only memory (read only memory, referred to as ROM), a programmable read-only memory (programmable read-only memory, referred to as PROM), an erasable programmable read-only memory (erasable programmable read-only memory, referred to as EPROM), an electrically erasable read-only memory (electrically erasable programmable read-only memory, referred to as EEPROM), etc. Where the memory is configured to store a program, and the processor executes a program after receiving the execution instruction. Further, the software programs and modules within the memory described above may further include an operating system, which may include various software components and/or drivers for managing system tasks (e.g., memory management, storage device control, power management, etc.) and may communicate with various hardware or software components, thereby providing an operating environment of other software components.

The processor may be an integrated circuit chip having a signal processing capability. The above processor may be a general-purpose processor, including a central processing unit (central processing unit, CPU), a network processor (network processor, NP), and the like. Various methods, steps, and logic block diagrams disclosed in the embodiments of the present disclosure may be implemented or performed. A general purpose processor may be a microprocessor or the processor may be any conventional processor or the like.

In some embodiments, a computer-readable storage medium is provided, where the computer-readable storage medium has computer-executable instructions stored thereon, and the computer-executable instructions, when executed by a processor, are configured to implement the methods as described above. A person of ordinary skilled in the art can appreciate that all or part of the processes in the above-described embodiment of the methods may be achieved by instructing related hardware through computer programs. The computer programs may be stored in a non-volatile computer-readable storage medium which, when executed, may include processes as the above-described embodiments of the methods. Where any references to the memory, storage, databases, or other media used in the embodiments provided by the present disclosure may include non-volatile and/or volatile memory. Non-volatile memory may include the read only memory (ROM), the programmable ROM (PROM), the electrically programmable ROM (EPROM), the electrically erasable programmable ROM (EEPROM), or a flash memory. Volatile memory may include the random access memory (RAM) or an external cache memory. As an illustration, and not limitation, the RAM is available in a variety of forms, such as a static RAM (SRAM), a dynamic RAM (DRAM), a synchronous DRAM (SDRAM), a double data rate SDRAM (DDRSDRAM), enhanced SDRAM (ESDRAM), Synchlink (Synchlink) DRAM (SLDRAM), a Rambus (Rambus) direct RAM (RDRAM), direct memory bus dynamic RAM (DRDRAM), and Rambus dynamic RAM (RDRAM), etc.

Other implementations of the present disclosure will be readily apparent to persons skilled in the art upon consideration of the specification and practice of the application disclosed herein. The present disclosure is intended to cover any variations, uses, or adaptive changes of the present disclosure, and these variations, uses, or adaptive changes follow general principles of the present disclosure and include common general knowledge or customary technical means in the art not disclosed by the present disclosure. The specification and embodiments are considered as exemplary only, and a true scope and spirit of the present disclosure are indicated by the following claims.

It should be understood that the present disclosure is not limited to the precise structure that has been described above and shown in the accompanying drawings, and various modifications and changes may be made without departing from the scope thereof. The scope of the present disclosure is limited only by the appended claims.

What is claimed is:

1. A warehousing system, comprising: a robot and a control terminal,
the control terminal being configured to send a first control instruction to the robot according to a current task, and the first control instruction comprises material fetching information and first destination information; and
the robot being configured to execute a material fetching operation according to the material fetching information, and transport a fetched-out first material to a first destination according to the first destination information;
wherein the first destination comprises a conveyor line corresponding to a workstation, the robot is specifically configured to dock with the conveyor line at an inlet to the conveyor line to transport the first material to the conveyor line, and the workstation is provided with a console for performing processing on the first material on the conveyor line;
wherein the conveyor line comprises a plurality of conveyor line outlets, the control terminal is specifically configured to determine a first target outlet from the plurality of conveyor line outlets, the control terminal is further configured to control the robot to move to the first target outlet to fetch out a second material which has been processed on the conveyor line;
wherein the conveyor line comprises at least one inlet; and
wherein, when the at least one inlet is a single conveyor line inlet, the first target outlet is an outlet farthest from the single conveyor line inlet and not currently parked with any robots; and, when the at least one inlet is a plurality of conveyor line inlets, the first target outlet is an outlet farthest from a nearest conveyor line inlet and not currently parked with any robots, the nearest conveyor line inlet being an inlet nearest from the console in the plurality of conveyor line inlets.

2. The system according to claim 1, wherein the at least one inlet to the conveyor line is the plurality of conveyor line inlets, the control terminal is further configured to take a second target inlet as a new first destination corresponding to the robot, and send a third control instruction comprising new first destination information to the robot after the robot transports the fetched-out first material to the first target inlet and before the robot places all materials on the conveyor line; wherein a distance between the second target inlet and the first target outlet is smaller than a distance between the first target inlet and the first target outlet and the second target inlet is not currently parked with a robot; and
the robot is configured to move to the second target inlet according to the new inlet location information, and transports a remaining unplaced material to the second target inlet.

3. The system according to claim 1, wherein the robot is configured to transport the fetched-out first material to the at least one inlet to the conveyor line according to the first destination information, and dock with the conveyor line at the at least one inlet to the conveyor line to place the first material on the conveyor line, the conveyor line is configured to cause the first material move to the console.

4. The system according to claim 3, wherein the conveyor line is configured to move the second material which has been processed via the console to the first target outlet;
the control terminal is further configured to send a second control instruction to the robot, and the second control instruction comprises outlet location information and second destination information; and
the robot is configured to move to the first target outlet according to the outlet location information, dock with the conveyor line at the first target outlet to fetch out the second material which has been processed on the conveyor line, and transport the second material which has been processed to a second destination according to the second destination information;
wherein the second destination comprises a shelf for storing materials or a material outbound location.

5. The system according to claim 4, wherein the control terminal is configured to send the second control instruction to the robot after the first target outlet is taken as an outlet location corresponding to the robot; and
the robot is configured to move to the first target outlet according to the outlet location information, and fetch out the second material which has been processed on the conveyor line at the first target outlet.

6. The system according to claim 5, wherein the control terminal is further configured to take the second target outlet as a new outlet location corresponding to the robot, and send a fourth control instruction comprising new outlet location information to the robot after the robot goes to the first target outlet according to the second control instruction and before satisfying a stopping condition of material fetching; wherein a distance between the second target outlet and the single conveyor line inlet or the first target inlet is greater than a distance between the first target outlet and the single conveyor line inlet or the nearest conveyor line inlet and the second target outlet is not currently parked with a robot; and
the robot is configured to move to the second target outlet according to the new outlet location information, and fetch out a third material which has been processed on the conveyor line at the second target outlet.

7. The system according to claim 3, wherein the conveyor line is configured to move the second material which has been processed via the console to the first target outlet;
the control terminal is further configured to send a second control instruction to the robot, and the second control instruction comprises outlet location information and second destination information; and
the robot is configured to move to the first target outlet according to the outlet location information, dock with the conveyor line at the first target outlet to fetch out the second material which has been processed on the conveyor line, and transport the second material which has been processed to a second destination according to the second destination information;
wherein the at least one inlet to the conveyor line is the plurality of conveyor line inlets, the control terminal is configured to determine a first target inlet from the plurality of conveyor line inlets, take the first target inlet as a first destination corresponding to the robot, and send the first control instruction to the robot, wherein the first target inlet is not currently parked with any robots; and the robot is configured to transport the fetched-out first material to the first target inlet according to the first destination information after completing the first material fetching operation.

8. A material handling method, applied to a control terminal, wherein the method comprises:

acquiring a current task;

sending a first control instruction to a robot according to the current task, wherein the first control instruction comprises material fetching information and first destination information, the first control instruction is used to instruct the robot to perform a material fetching operation according to the material fetching information, and transport a fetched-out first material to a first destination according to the first destination information;

wherein the first destination comprises a conveyor line corresponding to a workstation, the first control instruction is specifically used to instruct the robot to dock with the conveyor line at an inlet to the conveyor line to transport the first material to the conveyor line, the workstation is provided with a console for perform processing on the first material on the conveyor line, and the conveyor line comprises a plurality of conveyor line outlets;

determining a first target outlet from the plurality of conveyor line outlets; and controlling the robot to move to the first target outlet of the conveyor line to fetch out a second material which has been processed on the conveyor line, wherein the conveyor line comprises at least one inlet, when the at least one inlet to the conveyor line is a single conveyor line inlet, the first target outlet is an outlet farthest from the single conveyor line inlet and not currently parked with any robots;

and, when the at least one inlet to the conveyor line is a plurality of conveyor line inlets, the first target outlet is an outlet farthest from a nearest conveyor line inlet and not currently parked with any robots, the nearest conveyor line inlet being an inlet nearest from the console in the plurality of conveyor line inlets.

9. The method according to claim 8, further comprising:

sending a second control instruction to the robot, wherein the second control instruction comprises outlet location information and second destination information; and the second control instruction is used to instruct the robot to move to the first target outlet according to the outlet location information, docks with the conveyor line at the first target outlet to fetch out the second material which has been processed on the conveyor line, and transports the second material which has been processed to a second destination according to the second destination information;

wherein the second destination comprises a shelf for storing materials or a material outbound location.

10. The method according to claim 8, wherein the at least one inlet to the conveyor line is the plurality of conveyor line inlets, the method further comprising:

determining a first target inlet from the plurality of conveyor line inlets, the first target inlet being not currently parked with a robot; and taking the first target inlet as the first destination corresponding to the robot;

sending the first control instruction to the robot, wherein the first control instruction is used to instruct the robot to transport the fetched-out first material to the first target inlet according to the first destination information after completing the material fetching operation.

11. The method according to claim 8, further comprising:

after the first target outlet is taken as an outlet location corresponding to the robot, sending a second control instruction comprising outlet location information to the robot;

and the second control instruction is used to instruct the robot to move to the first target outlet according to the outlet location information, and fetch out the second material which has been processed on the conveyor line at the first target outlet.

12. The method according to claim 11, further comprising:

after the robot goes to the first target outlet according to the second control instruction and before a stopping condition of material fetching is satisfied, taking a second target outlet as a new outlet location corresponding to the robot, and sending a fourth control instruction comprising new outlet location information to the robot, wherein a distance between the second target outlet and the single conveyor line inlet or the nearest conveyor line inlet is greater than a distance between the first target outlet and the single conveyor line inlet or the nearest conveyor line inlet, and the second target outlet is not currently parked with any robots; and the fourth control instruction is used to instruct the robot to move to the second target outlet according to the new outlet location information, and fetch out a third material which has been processed on the conveyor line at the second target outlet;

wherein the stopping condition of material fetching comprises that the robot has been loaded full with materials or there is no material which has been processed on the conveyor line.

13. A material handling method applied to a robot, wherein the method comprises:

receiving a first control instruction sent by a control terminal according to a current task, wherein the first control instruction comprises material fetching information and first destination information; and performing a material fetching operation according to the material fetching information, and transporting a fetched-out first material to a first destination according to the first destination information, wherein the first destination comprises a conveyor line corresponding to a workstation;

after transporting the material to the first destination, docking with the conveyor line at an inlet to the conveyor line to transport the first material to the conveyor line, wherein the workstation is provided with a console for processing a second material on the conveyor line, wherein the conveyor line comprises a plurality of conveyor line outlets, moving to a first target outlet in the plurality of conveyor line outlets under a control of the control terminal to fetch out a second material which has been processed on the conveyor line;

wherein the conveyor line comprises at least one inlet, when the at least one inlet to the conveyor line is a single conveyor line inlet, the first target outlet is an outlet farthest from the single conveyor line inlet and not currently parked with any robots; and when the at least one inlet to the conveyor line is a plurality of conveyor line inlets, the first target outlet is an outlet farthest from a nearest conveyor line inlet and not currently parked with any robots, the nearest conveyor line inlet being nearest from the console in the plurality of conveyor line inlets.

14. The method according to claim 13, further comprising:
transporting the fetched-out first material to the at least one inlet to the conveyor line according to the first destination information, and docking with the conveyor line at the at least one inlet to place the first material on the conveyor line, wherein the conveyor line is configured to cause the first material to move to the console.

15. The method according to claim 13, wherein the first destination information comprises a first target inlet, the method further comprising:
after completing a material fetching operation, transporting the fetched-out first material to the first target inlet according to the first destination information;
receiving a third control instruction sent by the control terminal, wherein the third control instruction comprises new first destination information, and new first destination information comprises a second target inlet; and
transporting a remaining unplaced material to the second target inlet according to the new first destination information, and placing the remaining unplaced material on the conveyor line at the second target inlet.

16. The method according to claim 13, further comprising:
receiving a second control instruction sent by the control terminal, wherein the second control instruction comprises outlet location information and second destination information; and
moving to the first conveyor line outlet according to the outlet location information, docking with the conveyor line at the first target outlet to fetch out a material which has been processed on the conveyor line, and transporting the material which has been processed to a second destination according to the second destination information;
wherein the second destination comprises a shelf for storing materials or a material outbound location.

17. The method according to claim 16, wherein the outlet location information comprises the first target outlet, the method further comprising:
moving to the first target outlet according to the outlet location information, and fetching out the second material which has been processed on the conveyor line at the first target outlet;
receiving a fourth control instruction sent by the control terminal, wherein the fourth control instruction comprises new outlet location information, and the new outlet location information comprises a second target outlet; and
moving to the second target outlet according to the new outlet location information; and fetching out a third material which has been processed on the conveyor line at the second target outlet.

18. A control terminal, comprising:
at least one processor; and
a memory connected in a communicational way to the at least one processor;
wherein the memory has instructions that can be executed by the at least one processor stored thereon, and the instructions are executed by the at least one processor to cause the control terminal to:
acquire a current task;
send a first control instruction to a robot according to the current task, wherein the first control instruction comprises material fetching information and first destination information, the first control instruction is used to instruct the robot to perform a material fetching operation according to the material fetching information, and transport a fetched-out first material to a first destination according to the first destination information,
wherein the first destination comprises a conveyor line corresponding to a workstation, the first control instruction is specifically used to instruct the robot to dock with the conveyor line at an inlet to the conveyor line to transport the first material to the conveyor line, the workstation is provided with a console for perform processing on the first material on the conveyor line, and the conveyor line comprises a plurality of conveyor line outlets;
determine a first target outlet from the plurality of conveyor line outlets; and
control the robot to move to the first target outlet of the conveyor line to fetch out a second material which has been processed on the conveyor line,
wherein the conveyor line comprises at least one inlet, when the at least one inlet to the conveyor line is a single conveyor line inlet, the first target outlet is an outlet farthest from the single conveyor line inlet and not currently parked with any robots; and, when the at least one inlet to the conveyor line is a plurality of conveyor line inlets, the first target outlet is an outlet farthest from a nearest conveyor line inlet and not currently parked with any robots, the nearest conveyor line inlet being an inlet nearest from the console in the plurality of conveyor line inlets.

19. A robot, comprising:
at least one processor; and
a memory connected in a communicational way to the at least one processor;
wherein the memory has instructions that can be executed by the at least one processor stored thereon, and the instructions are executed by the at least one processor to cause the robot to:
receive a first control instruction sent by a control terminal according to a current task, wherein the first control instruction comprises material fetching information and first destination information; and
perform a material fetching operation according to the material fetching information, and transport a fetched-out first material to a first destination according to the first destination information, wherein the first destination comprises a conveyor line corresponding to a workstation;
after transporting the material to the first destination, dock with the conveyor line to transport the first material to the conveyor line, wherein the workstation is provided with a console for processing a second material on the conveyor line,
wherein the conveyor line comprises a plurality of conveyor line outlets, move to a first target outlet in the plurality of conveyor line outlets under a control of the control terminal to fetch out a second material which has been processed on the conveyor line;
wherein the conveyor line comprises at least one inlet, when the at least one inlet to the conveyor line is a single conveyor line inlet, the first target outlet is an outlet farthest from the single conveyor line inlet and not currently parked with any robots; and when the at least one inlet to the conveyor line is a plurality of conveyor line inlets, the first target outlet is an outlet farthest from a nearest conveyor line inlet and not currently parked with any robots, the nearest conveyor line inlet being nearest from the console in the plurality of conveyor line inlets.

* * * * *